(12) United States Patent
Hernandez et al.

(10) Patent No.: US 7,793,856 B2
(45) Date of Patent: Sep. 14, 2010

(54) NO-IDLE HEATING OF A MOTOR VEHICLE INTERIOR AND ENGINE PRE-HEAT USING ENGINE COOLANT

(75) Inventors: Joaquin J. Hernandez, Fort Wayne, IN (US); Charles E. Howard, Silver Lake, IN (US); Colin J. Casey, Fort Wayne, IN (US); Steven R. Lovell, Fort Wayne, IN (US); Wayne F. Bultemeier, Hoagland, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 1420 days.

(21) Appl. No.: 11/211,417

(22) Filed: Aug. 25, 2005

(65) Prior Publication Data

US 2007/0063062 A1    Mar. 22, 2007

(51) Int. Cl.
    B60H 1/20    (2006.01)
    B61D 27/00   (2006.01)
(52) U.S. Cl. ................ 237/12.3 B; 65/42; 65/43
(58) Field of Classification Search ........... 237/12.3 B; 165/42, 43
    See application file for complete search history.

(56) References Cited

U.S. PATENT DOCUMENTS

| 4,300,720 | A | * | 11/1981 | Baier et al. | 237/12.3 A |
| 4,448,157 | A |  | 5/1984 | Eckstein et al. | |
| 4,531,379 | A | * | 7/1985 | Diefenthaler, Jr. | 62/236 |
| 4,574,747 | A | * | 3/1986 | Hirano | 123/41.27 |
| 4,591,691 | A | * | 5/1986 | Badali | 219/202 |
| 4,611,466 | A |  | 9/1986 | Keedy | |
| 4,682,649 | A |  | 7/1987 | Greer | |
| 4,756,359 | A |  | 7/1988 | Greer | |
| 4,762,170 | A |  | 8/1988 | Nijar et al. | |
| 4,825,663 | A |  | 5/1989 | Nijar et al. | |
| 4,905,893 | A | * | 3/1990 | Kiskis | 237/2 A |
| 5,211,333 | A | * | 5/1993 | Schmalenbach et al. | 237/2 A |
| 5,333,678 | A | * | 8/1994 | Mellum et al. | 165/42 |
| 5,908,069 | A | * | 6/1999 | Baldwin et al. | 165/41 |
| 6,932,148 | B1 | * | 8/2005 | Brummett et al. | 165/43 |
| 7,240,725 | B2 | * | 7/2007 | Horn et al. | 165/202 |
| 7,316,119 | B2 | * | 1/2008 | Allen | 62/236 |
| 7,614,368 | B2 | * | 11/2009 | Gehres et al. | 123/41.08 |
| 2004/0035112 | A1 |  | 2/2004 | Bhabra | |
| 2005/0138942 | A1 | * | 6/2005 | Grimm et al. | 62/180 |

OTHER PUBLICATIONS

Espar Heater Systems, proposal on their two-loop system.

* cited by examiner

*Primary Examiner*—Steven B McAllister
*Assistant Examiner*—Frances Kamps
(74) *Attorney, Agent, or Firm*—Jeffrey P. Calfa; Mark C. Bach

(57) ABSTRACT

When a truck engine (12) is not running, an auxiliary coolant heater (32) can heat engine coolant and pump it through an occupant compartment heater (16). A coolant flow control system (10), including a valve assembly (84), associates the auxiliary heater (32) with both the occupant compartment heater (16) and engine (12) for selectively distributing heated coolant. When engine (12) has been running and is shut off, auxiliary heater (32) can be turned on and valve assembly (84) operated for occupant compartment heating while keeping the engine (12) warm. When the engine is cold, the auxiliary heater can be turned on and the valve assembly can be operated for engine pre-heating prior to starting.

5 Claims, 2 Drawing Sheets

NO-IDLE HEATING OF A MOTOR VEHICLE INTERIOR AND ENGINE PRE-HEAT USING ENGINE COOLANT

FIELD OF THE INVENTION

This invention relates to motor vehicles, such as highway trucks, that are powered by liquid-cooled combustion engines, and that have auxiliary coolant heaters for heating engine coolant and circulating the heated coolant to the engines for engine pre-heating and to occupant compartment heaters for occupant compartment heating.

BACKGROUND OF THE INVENTION

A common cooling system for a liquid-cooled internal combustion engine that powers a motor vehicle comprises a radiator behind which is a fan that may be engine-driven. A pump that may also be engine-driven circulates engine coolant from the engine to the radiator and back to the engine. Coolant that has been heated by the running engine gives up heat to the radiator core through which the fan draws air to aid heat transfer from the core to the air.

Certain motor vehicles, like some large trucks for example, have occupant compartments (cabs) that include at least a driver's compartment and sometimes a sleeper compartment behind the driver's compartment. One way to provide cold weather heating for an occupant compartment is by allowing the engine to idle while the vehicle is parked so as to keep the engine coolant sufficiently hot for adequate heating by an occupant compartment heater through which the coolant is circulated. That however is wasteful of fuel because it necessitates running the engine.

An on-board auxiliary coolant heater can instead provide ample heating without running the engine. This is sometimes referred to as "no-idle" heating. One brand of commercially available heaters offers sizes whose heat output ranges from 5,500 BTU to 120,000 BTU, operate on either 12 volts or 24 volts, and can run on gasoline or diesel fuel that is carried by the vehicle. An auxiliary coolant heater may alternatively or additionally be used for engine pre-heating.

A typical auxiliary coolant heater is reasonably compact and contains components necessary to heat and circulate engine coolant while the engine is off. The heater may provide heat at different selectable levels, and may be under the control of an associated control unit to maintain a set temperature.

When occupant compartment heating is called for, a coolant pump starts circulating coolant. A heating device heats the coolant as it circulates so that heated coolant flows out of the heater.

There are various types of auxiliary coolant heaters including those that use fuel carried by the vehicle, those that have electric heater elements, and generators.

SUMMARY OF THE INVENTION

The present invention relates to a novel coolant circuit for selectively distributing heated coolant from an on-board auxiliary coolant heater in a motor vehicle, such as a highway truck. When the engine is shut off after having been running, the invention can provide occupant compartment heating while keeping the engine warm. When a cold engine is to be started, the invention can provide engine pre-heating prior to starting. The coolant circuit also allows engine-heated coolant to heat the occupant compartment when the engine is running and the auxiliary coolant heater is not heating the occupant compartment.

A generic aspect of the present invention relates to a motor vehicle comprising a liquid-cooled combustion engine having ports for coolant to leave the engine and to return to the engine.

An occupant compartment has an interior space that is heated by an occupant compartment heater having an inlet port through which coolant enters and an outlet port through which coolant exits.

An auxiliary coolant heater comprises an inlet port through which coolant enters the auxiliary coolant heater for heating and an outlet port through which heated coolant exits the auxiliary coolant heater.

A coolant flow control system comprises flow paths and a valve assembly for connecting the engine ports, the occupant compartment heater ports, and the auxiliary coolant heater ports, such that by selective operation of the valve assembly, the flow control system can be placed in a first state that with the engine not running, divides flow from the auxiliary coolant heater so that some, but not all, of the flow from the auxiliary coolant heater flows through the engine, and to a second state that with the engine not running, causes all of the flow from the auxiliary coolant heater outlet to flow through the engine.

The foregoing, along with further features and advantages of the invention, will be seen in the following disclosure of a presently preferred embodiment of the invention depicting the best mode contemplated at this time for carrying out the invention. This specification includes a drawing, now briefly described as follows.

DESCRIPTION OF THE PREFERRED EMBODIMENT

Figure 1:
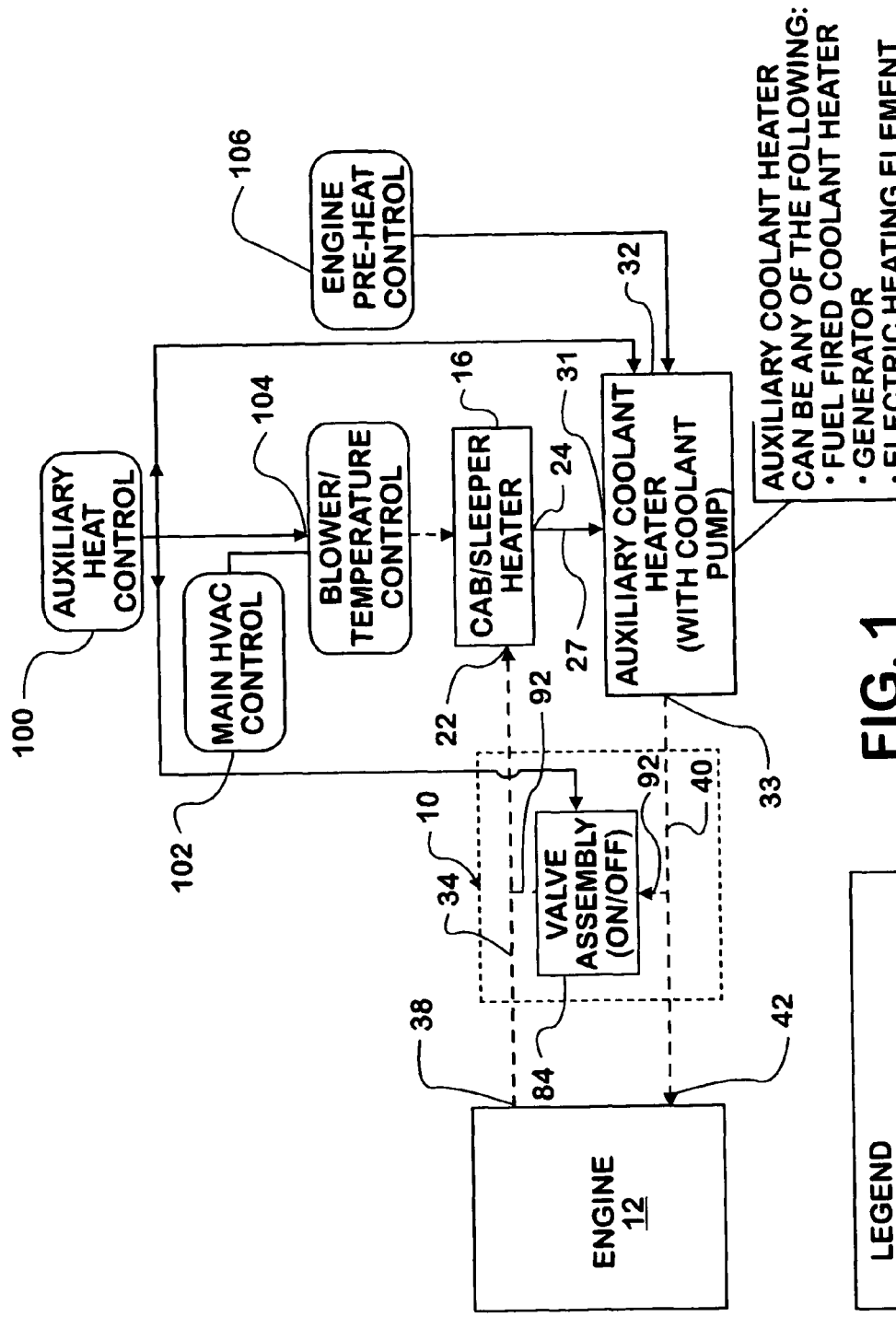
FIG. 1 is a schematic diagram showing a portion of a vehicle engine's cooling system with which a first embodiment of the inventive system is associated.

FIG. 1 shows a coolant circuit having a coolant flow control system 10 and associated electrical control system illustrative of principles of the present invention. The invention is described by way of example in a highway truck that is propelled by an engine 12, such as a diesel engine that is liquid-cooled. Such a truck has an occupant compartment, also called a cab, that includes at least a driver's compartment, and optionally a sleeper compartment behind the driver's compartment. A heater 16 provides heat to the occupant compartment and comprises some form of heat exchanger through which coolant is circulated and some form of blower system for moving air across the heat exchanger to deliver heated air to the occupant compartment. Heater 16 may provide heat for the driver's compartment, for the sleeper compartment, or for both, depending on the particular truck model.

Heater 16 comprises an inlet port 22 through which coolant enters the heater and an outlet port 24 through which coolant leaves the heater.

When engine 12 is running, it can supply engine-heated coolant to heater 16. When engine 12 is not running, an auxiliary coolant heater 32 is available for supplying heated coolant. The auxiliary coolant heater may be like the one described earlier, comprising a self-contained pump for circulating engine coolant when engine 12 is not running. Coolant enters heater 32 through an inlet port 31 and leaves through an outlet port 33.

Engine 12 has two ports 38, 42 that provide for system 10 to associate with the engine. Port 38 is at an engine coolant supply (pressure) side that delivers coolant. Port 42 is at an engine coolant return (suction) side where coolant returns to the engine.

System 10 connects to engine 12 at ports 38, 42 and comprises a flow path 34 from engine port 38 to occupant compartment heater port 22 and a flow path 40 from auxiliary compartment heater port 33 to engine port 42.

System 10 comprises an additional flow path 92 having an inlet end that tees into flow path 40 and an outlet end that tees into flow path 34. Flow through flow path 92 is controlled by an electrically controlled, normally closed, on-off valve assembly 84. Valve assembly 84 may be constructed in any of various ways and may comprise one or more valves or components.

A further flow path 27 of the coolant circuit connects occupant compartment heater outlet port 24 and auxiliary heater inlet port 31.

One set of operating conditions comprises valve assembly 84 closed, engine 12 off, and heater 32 running to both heat and pump coolant. Coolant that has been heated by heater 32 circulates through flow path 40, through engine 12, through flow path 34, and through heater 16, returning to heater 32 through flow path 27. By running the entire coolant flow from heater 32 through engine 12 first before the flow reaches heater 16, the engine will obtain heat from heater 32. This set of conditions is used for engine pre-heating when the engine is cold and requires pre-heating before starting.

Another set of operating conditions comprises valve assembly 84 open, engine 12 off, and heater 32 running. Coolant that has been heated by heater 32 will be pumped into flow path 40. Upon reaching the point where flow path 92 tees into flow path 40, the flow divides. One portion of the divided flow passes through flow path 92 and the remainder through engine 12. The divided flows reunite where flow path 92 tees into flow path 34. From there, the reunited flows enter and pass through occupant compartment heater 16 before returning to auxiliary coolant heater 32 via flow path 27.

The flow through engine 12 can serve to keep the engine warm after the engine has been running and is shut off, while the reunited flows entering heater 16 provide sufficient heat for heater 16 to deliver ample heat for occupant compartment heating. In this state of operation, the inventive system can attain compliance with recommendation RP-432(T) of the Truck Maintenance Council.

Another set of operating conditions comprises valve assembly 84 closed, heater 32 not running, and engine 12 running. With heater 32 not running, it still allows coolant to flow through it. The engine coolant pump pumps coolant from port 38 through flow path 34, heater 16, flow path 27, auxiliary coolant heater 32, and flow path 40 back to port 42. This flow enables windshield defrosting and occupant compartment heating via heater 16 using controls within the occupant compartment.

The associated electrical control system comprises an auxiliary heat control 100, a main HVAC control 102, a blower/temperature control 104, and an engine pre-heat control 106. The particular details of blower/temperature control 104 in any particular vehicle will typically depend on the particular vehicle, and therefore control 104 is shown generically. Main control 102 will typically comprise controls that are available to the driver for blower/temperature control when the vehicle is being driven, but that may also be effective in certain ways when the vehicle is not being driven and the engine is off. Auxiliary control 100 may be either independent of or integrated with main control 102, but regardless of that, the auxiliary control does have control of valve assembly 84 and when it requests that valve assembly 84 be energized, it causes valve assembly to be open.

With auxiliary control 100 off, the main HVAC controls that are accessible to the driver control the blower system and temperature of air that is heated by heater 16 due to flow of engine-heated coolant through heater 16. The flow of heated air is directed by an air distribution system that may take any of various forms for distributing the heater air inside the occupant compartment as desired by the driver. The air may be distributed for any one or more of windshield defrosting, driver's compartment heating, and sleeper compartment heating when the truck has a sleeper compartment.

When engine 12 needs to be warmed up, engine pre-heat control 106 is used for pre-heating using the full flow output of heater 32. Valve assembly 84 is not energized and therefore remains closed. Auxiliary coolant heater 32 operates to heat and pump coolant. The coolant from heater 32 flows first through engine 12 before flowing through heater 16.

Instead of valve assembly 84 being normally closed, it could be normally open, in which case energizing the valve assembly will cause it to close. Unlike a normally closed valve assembly, a failure that prevents a normally open valve assembly from closing will impair the ability of the auxiliary coolant heater to pre-heat the engine because not all the coolant will flow through engine 12. With the engine running and auxiliary control 100 off, such a failure will also prevent the full flow from the engine from passing through heater 16. For those reasons, a normally closed valve assembly may be preferred.

Figure 2:
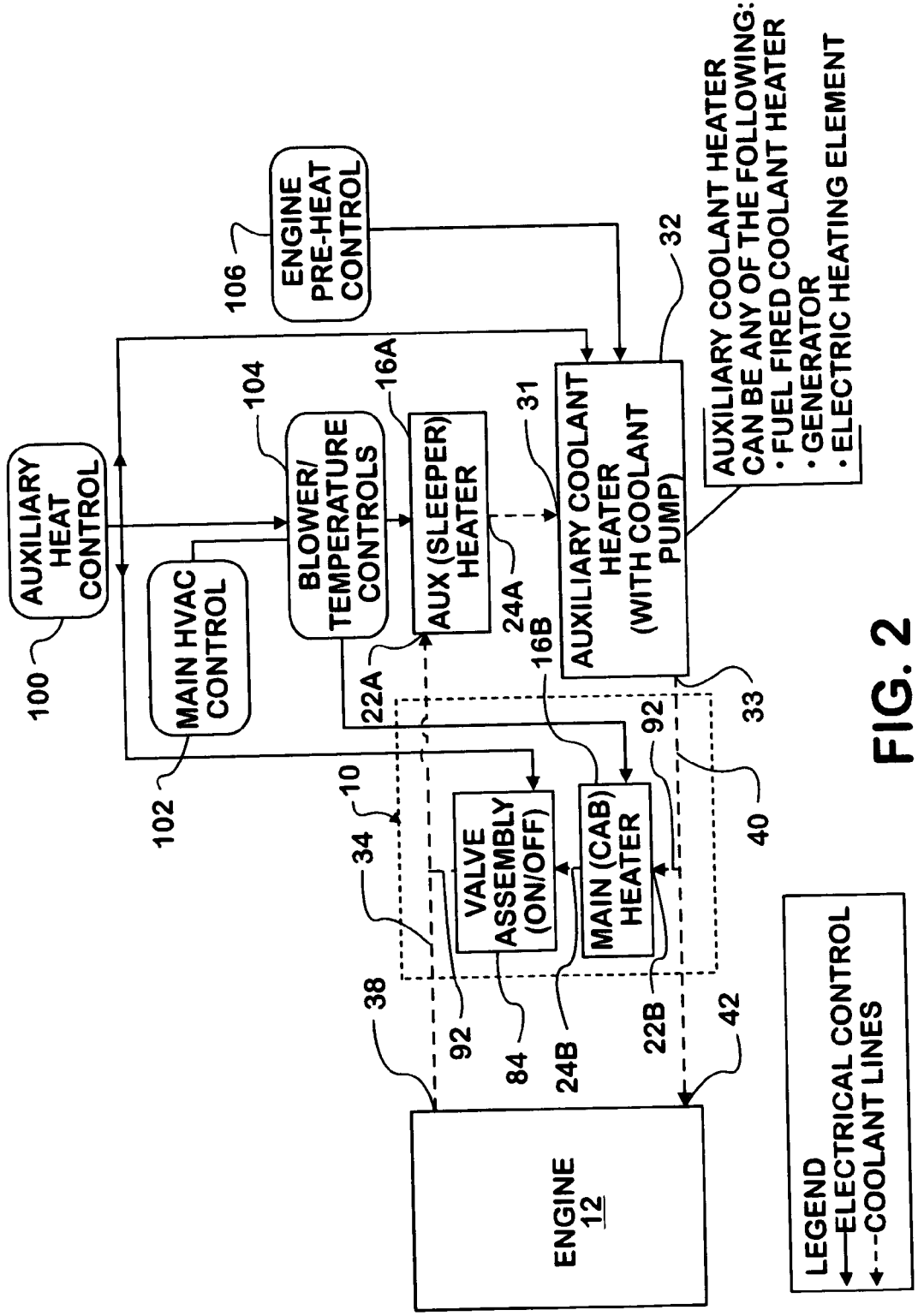
FIG. 2 is a schematic diagram showing a portion of a vehicle engine's cooling system with which a second embodiment of the inventive system is associated.

FIG. 2 shows a second embodiment that is organized and arranged like the first embodiment shown in and described with reference to FIG. 1. The same reference numbers are used in FIG. 2 to identify the same elements in FIG. 1, and so a repeated description is unnecessary in order to understand FIG. 2.

FIG. 2 differs from FIG. 1 in that discrete occupant compartment heaters are shown, one for the sleeper compartment, designated 16A, the other for the driver's compartment 16B. The latter 16B is identified in the drawing as the main (cab) heater while the former 16A is identified as the auxiliary (sleeper) heater. Each has a respective inlet port 22A, 22B and a respective outlet port 24A, 24B.

The drawing shows that one of the two heaters, heater 16A, is connected in the coolant circuit in the same manner as heater 16 in FIG. 1. The other heater 16B however is connected with its inlet port 22B teed into flow path 40 and its outlet port 24B connected to the inlet of valve assembly 84.

Item 104 in FIG. 2 denotes that respective blower/temperature controls are associated with each heater so that each can be controlled independently of the other.

Valve assembly 84 can be either normally open or normally closed.

When valve assembly 84 is of the normally open type and engine pre-heat control 106 is operating auxiliary coolant heater 32 for pre-heating engine 12, valve assembly 84 is energized closed so that the full flow from heater 32 passes first through flow path 40, then engine 12, then flow path 34, and then auxiliary heater 16A, before returning to heater 32. No coolant flows through cab heater 16B because valve assembly 84 is closed.

When valve assembly 84 is of the normally open type and auxiliary heat control 100 is operating auxiliary coolant heater 32, valve assembly 84 is not energized and consequently remains open. The flow from heater 32 therefore divides, with some flow through flow path 92 containing heater 16B and the remainder through engine 12. The divided flows rejoin in flow path 34 to pass through auxiliary heater 16A before returning to heater 32.

When valve assembly 84 is of the normally open type and both auxiliary heat control 100 and engine pre-heat control 106 are off, valve assembly 84 is not energized and consequently remains open. Coolant heated by engine 12 will leave the engine through port 38 to enter flow path 34 where the flow divides, with some flow through flow path 92 containing valve assembly 84 and cab heater 16B and the remainder first through sleeper heater 16A and then auxiliary coolant heater 32. The flow from heater 32 rejoins the flow from cab heater 16B with the rejoined flows continuing through flow path 40 and returning to engine 12 through port 42. By using the main HVAC control 102, the cab can be heated as desired. This includes heating of the driver compartment, with defrost as needed, and may include heating of the sleeper compartment either incidental to heating of the driver compartment because of air circulation between the two compartments, or intentionally through a blower system that is capable of serving the sleeper compartment.

When valve assembly 84 is of the normally closed type and engine pre-heat control 106 is operating auxiliary coolant heater 32 to pre-heat engine 12, valve assembly 84 is not energized, and therefore remains closed, so that the full flow from heater 32 passes first through flow path 40, then engine 12, then flow path 34, and then auxiliary heater 16A, before returning to heater 32. No coolant flows through cab heater 16B because valve assembly 84 is closed.

When valve assembly 84 is of the normally closed type and auxiliary heat control 100 is operating auxiliary coolant heater 32, valve assembly 84 is energized and consequently opens. The flow from heater 32 therefore divides, with some flow through heater 16B and the remainder through engine 12. The divided flows rejoin in flow path 34 to pass through auxiliary heater 16A before returning to heater 32. By using blower temperature controls that control heating of the sleeper compartment, it can be heated as desired.

When valve assembly 84 is of the normally closed type and both auxiliary heat control 100 and engine pre-heat control 106 are off, main HVAC control 102 can control valve assembly 84 to cause it to be energized, and consequently open, when heating is desired. Coolant heated by engine 12 will leave the engine through port 38 to enter flow path 34 where the flow divides, with some entering flow path 92 to pass through valve assembly 84 and then cab heater 16B, while the remainder flows first through sleeper heater 16A and then auxiliary coolant heater 32. The flow from heater 32 rejoins the flow from cab heater 16B with the rejoined flows continuing through flow path 40 and returning to engine 12 through port 42. By using the main HVAC control 102, the cab can be heated, with the possibility of sleeper compartment heating either incidental to driver compartment heating or deliberate if the vehicle contains a suitable blower system.

While a presently preferred embodiment of the invention has been illustrated and described, it should be appreciated that principles of the invention apply to all embodiments falling within the scope of the following claims.

What is claimed is:

1. A motor vehicle comprising:
   a liquid-cooled combustion engine comprising a first port through which coolant can leave the engine and a second port through which coolant can return to the engine;
   a driver compartment that is heated by a driver compartment heater having an inlet port through which coolant enters and an outlet port through which coolant exits and a sleeper compartment that is heated by a sleeper compartment heater having an inlet port through which coolant enters and an outlet port through which coolant exits;
   an auxiliary coolant heater comprising an inlet port through which coolant enters the auxiliary coolant heater for heating and an outlet port through which heated coolant exits the auxiliary coolant heater; and
   a coolant flow control system comprising flow paths and a valve assembly that is selectively operable to first and second states for connecting the engine ports, the driver compartment heater ports, the sleeper compartment heater ports, and the auxiliary coolant heater ports to provide, when the valve assembly is in the first state, for coolant flow from the auxiliary coolant heater outlet port to divide into a first portion that flows through the engine and a second portion that flows through a first of the two compartment heaters, and for the first and second portions to rejoin and flow through a second of the two compartment heaters before returning to the auxiliary coolant heater inlet port, and
   when the valve assembly is in the second state, for the entire coolant flow from the auxiliary coolant heater outlet port to flow through the engine and the second of the two compartment heaters before returning to the auxiliary coolant heater inlet port, and not to flow through the first of the two compartment heaters, wherein the first compartment heater is disposed for primarily heating the driver compartment and the second compartment heater is disposed for primarily heating the sleeper compartment and wherein the valve assembly is in series flow relation with the driver compartment heater between the location where the flow from the auxiliary coolant heater outlet port divides and the location where the first and second portions rejoin.

2. A motor vehicle as set forth in claim 1 wherein the valve assembly comprises an electrically controlled, normally open shut-off valve that is remotely operable to closed when energized and that is open when not energized.

3. A motor vehicle as set forth in claim 1 wherein the valve assembly comprises an electrically controlled, normally closed shut-off valve that is remotely operable to open when energized and that is closed when not energized.

4. A motor vehicle as set forth in claim 1 wherein with the valve assembly in the first state, with the auxiliary coolant heater not heating, and with the engine running, coolant flow from the engine divides into a first portion that flows through the first of the two compartment heaters, and a second portion that flows through the second of the two compartment heaters and the auxiliary coolant heater, and the first and second flows return to the engine.

5. A motor vehicle as set forth in claim 1 wherein the second portion of the flow passes first through the second of the two compartment heaters and then the auxiliary coolant heater.

* * * * *